(12) United States Patent
Leone et al.

(10) Patent No.: US 9,528,474 B2
(45) Date of Patent: Dec. 27, 2016

(54) FUEL SEPARATION VIA FUEL VAPOR MANAGEMENT SYSTEMS

(71) Applicant: Ford Global Technologies, LLC, Dearborn, MI (US)

(72) Inventors: Thomas G. Leone, Ypsilanti, MI (US); James Eric Anderson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/947,982

(22) Filed: Nov. 20, 2015

(65) Prior Publication Data

US 2016/0076492 A1  Mar. 17, 2016

Related U.S. Application Data

(62) Division of application No. 14/062,398, filed on Oct. 24, 2013, now abandoned.

(51) Int. Cl.
| | |
|---|---|
| *F02B 13/00* | (2006.01) |
| *F02M 25/08* | (2006.01) |
| *F02M 43/00* | (2006.01) |
| *F02M 37/00* | (2006.01) |
| *F02D 19/06* | (2006.01) |
| *F02D 19/08* | (2006.01) |

(Continued)

(52) U.S. Cl.
CPC ........ *F02M 25/089* (2013.01); *F02D 19/0649* (2013.01); *F02D 19/0665* (2013.01); *F02D 19/0668* (2013.01); *F02D 19/081* (2013.01); *F02D 19/084* (2013.01); *F02D 41/0025* (2013.01); *F02D 41/0032* (2013.01); *F02D 41/0042* (2013.01); *F02D 41/02* (2013.01); *F02M 25/0836* (2013.01); *F02M 25/0854* (2013.01); *F02M 37/0088* (2013.01); *F02M 43/00* (2013.01); *F01N 5/02* (2013.01); *F02D 13/0265* (2013.01); *F02M 69/044* (2013.01); *Y02T 10/16* (2013.01); *Y02T 10/36* (2013.01)

(58) Field of Classification Search
CPC .. F02M 25/0836; F02M 25/089; F02M 25/08; F02M 25/0872; F02D 41/003; F02D 41/0032
USPC ................. 123/575, 519, 520, 557
See application file for complete search history.

(56) References Cited

U.S. PATENT DOCUMENTS

| | | |
|---|---|---|
| 3,254,620 A | 6/1966 | Cannon |
| 4,237,850 A | 12/1980 | Connor et al. |

(Continued)

FOREIGN PATENT DOCUMENTS

| | | |
|---|---|---|
| JP | 407019124 A | 1/1995 |
| JP | 2006257907 A | 9/2006 |

(Continued)

*Primary Examiner* — Marguerite McMahon
*Assistant Examiner* — James Kim
(74) *Attorney, Agent, or Firm* — Julie Voutyras; Alleman Hall McCoy Russell & Tuttle LLP (57) ABSTRACT

Systems and methods for separating higher octane fuel from a fuel mixture are presented. In one example, fuel vapors may be limited or constrained from migrating to fuel tanks storing lower octane fuels. The systems may vent fuel vapors from a plurality of fuel tanks to a single fuel vapor storage canister. Alternatively, the systems may vent fuel vapors from the plurality of fuel tanks to a plurality of fuel vapor storage canisters.

16 Claims, 8 Drawing Sheets

(51) Int. Cl.
  *F02D 41/00*   (2006.01)
  *F02D 41/02*   (2006.01)
  *F02D 13/02*   (2006.01)
  *F01N 5/02*   (2006.01)
  *F02M 69/04*   (2006.01)

(56) References Cited

U.S. PATENT DOCUMENTS

| | | | |
|---|---|---|---|
| 4,391,716 A | 7/1983 | McCurry | |
| 5,056,494 A * | 10/1991 | Kayanuma | F02M 25/0872 |
| | | | 123/516 |
| 5,237,978 A | 8/1993 | Bailey | |
| 5,632,252 A * | 5/1997 | Hyodo | F02D 41/0042 |
| | | | 123/520 |
| 6,363,919 B1 | 4/2002 | Isobe et al. | |
| 6,450,193 B1 | 9/2002 | Constantinou | |
| 6,460,517 B1 * | 10/2002 | Dauer | F02M 25/0836 |
| | | | 123/516 |
| 6,553,974 B1 * | 4/2003 | Wickman | F02M 37/20 |
| | | | 123/516 |
| 6,793,483 B2 | 9/2004 | Watanabe | |
| 7,293,552 B2 | 11/2007 | Leone et al. | |
| 7,331,334 B2 | 2/2008 | Leone et al. | |
| 7,357,101 B2 * | 4/2008 | Boyarski | F02M 25/0228 |
| | | | 123/1 A |
| 7,389,751 B2 | 6/2008 | Leone et al. | |
| 7,395,786 B2 * | 7/2008 | Leone | F02D 19/0684 |
| | | | 123/1 A |
| 7,426,925 B2 | 9/2008 | Leone et al. | |
| 7,469,684 B2 | 12/2008 | Leone et al. | |
| 7,647,916 B2 | 1/2010 | Leone et al. | |
| 7,721,710 B2 | 5/2010 | Leone et al. | |
| 7,845,315 B2 | 12/2010 | Leone et al. | |
| 7,877,189 B2 | 1/2011 | Leone | |
| 8,065,979 B2 | 11/2011 | Leone et al. | |
| 8,118,009 B2 | 2/2012 | Pursifull et al. | |
| 8,127,745 B2 | 3/2012 | Surnilla et al. | |
| 8,141,356 B2 | 3/2012 | Leone et al. | |
| 8,315,788 B2 | 11/2012 | Surnilla et al. | |
| 8,375,899 B2 | 2/2013 | Leone et al. | |
| 8,387,591 B2 | 3/2013 | Surnilla et al. | |
| 8,550,058 B2 | 10/2013 | Pursifull et al. | |
| 9,010,305 B2 | 4/2015 | Leone et al. | |
| 9,121,355 B2 | 9/2015 | Leone | |
| 2005/0103285 A1 * | 5/2005 | Oda | F02B 51/00 |
| | | | 123/3 |
| 2007/0295307 A1 | 12/2007 | Kerns | |
| 2008/0000633 A1 | 1/2008 | Xu et al. | |
| 2008/0006333 A1 * | 1/2008 | Partridge | B60K 15/03 |
| | | | 137/571 |
| 2015/0052877 A1 | 2/2015 | Leone et al. | |
| 2015/0059700 A1 | 3/2015 | Leone et al. | |
| 2015/0114359 A1 | 4/2015 | Leone et al. | |

FOREIGN PATENT DOCUMENTS

| | | |
|---|---|---|
| SU | 0731020 A | 4/1980 |
| SU | 0848725 A | 7/1981 |

* cited by examiner

FUEL SEPARATION VIA FUEL VAPOR MANAGEMENT SYSTEMS

CROSS REFERENCE TO RELATED APPLICATIONS

The present application is a divisional of U.S. patent application Ser. No. 14/062,398, entitled "FUEL SEPARATION VIA FUEL VAPOR MANAGEMENT SYSTEMS," filed on Oct. 24, 2013, the entire contents of which are hereby incorporated by reference for all purposes.

FIELD

The present description relates to a system and methods for separating a higher octane fuel from a lower octane fuel mixture and maintaining separation of the higher and lower octane fuels in the presence of fuel system diurnal heating and cooling. The systems may be particularly useful for vehicles that include two or more fuel tanks.

BACKGROUND AND SUMMARY

An engine may be supplied different types of fuel during different engine operating conditions to enhance engine performance and/or fuel economy. For example, an engine may be supplied gasoline via a first fuel injector and ethanol via a second fuel injector. The two fuels may be supplied from a fuel mixture that is separated into two fuels or via filling different fuel tanks with different fuels.

United States of America Patent Publication 2008/000633 describes systems to handle fuel tank vapors for multiple fuel tanks. However, in the systems described by publication 2008/000633 fuel vapors of higher octane fuels may condense in fuel tanks holding or storing lower octane fuel, and vice versa. Consequently, the higher octane fuel may not be best utilized, or alternatively, the higher octane fuel may have to be separated from the lower octane fuel so that it may be utilized. However, parasitic losses may increase due to energy being lost from separating the higher octane fuel from the lower octane fuel.

The inventors herein have recognized the above-mentioned disadvantages and have developed a fuel storage system, comprising: a first fuel tank; a second fuel tank; a first fuel vapor storage canister; a second fuel vapor storage canister; a first conduit coupled to the first fuel tank and the first fuel vapor storage canister; a second conduit not coupled to the first conduit, the second conduit coupled to the first fuel tank and the second fuel vapor storage canister; and a valve positioned along the second conduit.

By not allowing fluidic communication between fuel tank vapor paths, it may be possible to prevent higher octane fuel vapors from condensing and mixing with lower octane fuel in a fuel tank storing lower octane fuel. Further, fuel tank vapor paths may be constructed such that fuel vapors originating from fuel tanks storing fuel having a lower octane number may be directed to a fuel tank storing fuel having a higher octane number. In this way, high octane fuel vapors that were produced via diurnal fuel system heating may be captured in a fuel tank storing a fuel having a higher octane number so that higher octane fuel vapors may condense into a higher octane liquid fuel. Additionally, parasitic losses associated with separating higher octane fuel from a lower octane fuel mixture may be reduced by taking advantage of diurnal heating so that separating higher octane fuel from a lower octane fuel mixture may not require engine work.

The present description may provide several advantages. In particular, the systems described may reduce parasitic engine losses that decrease engine fuel economy. Additionally, the systems may provide for more efficient use of fuel vapors. Further still, the systems described may be applied to systems that include more than two fuel tanks and two types of fuel.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
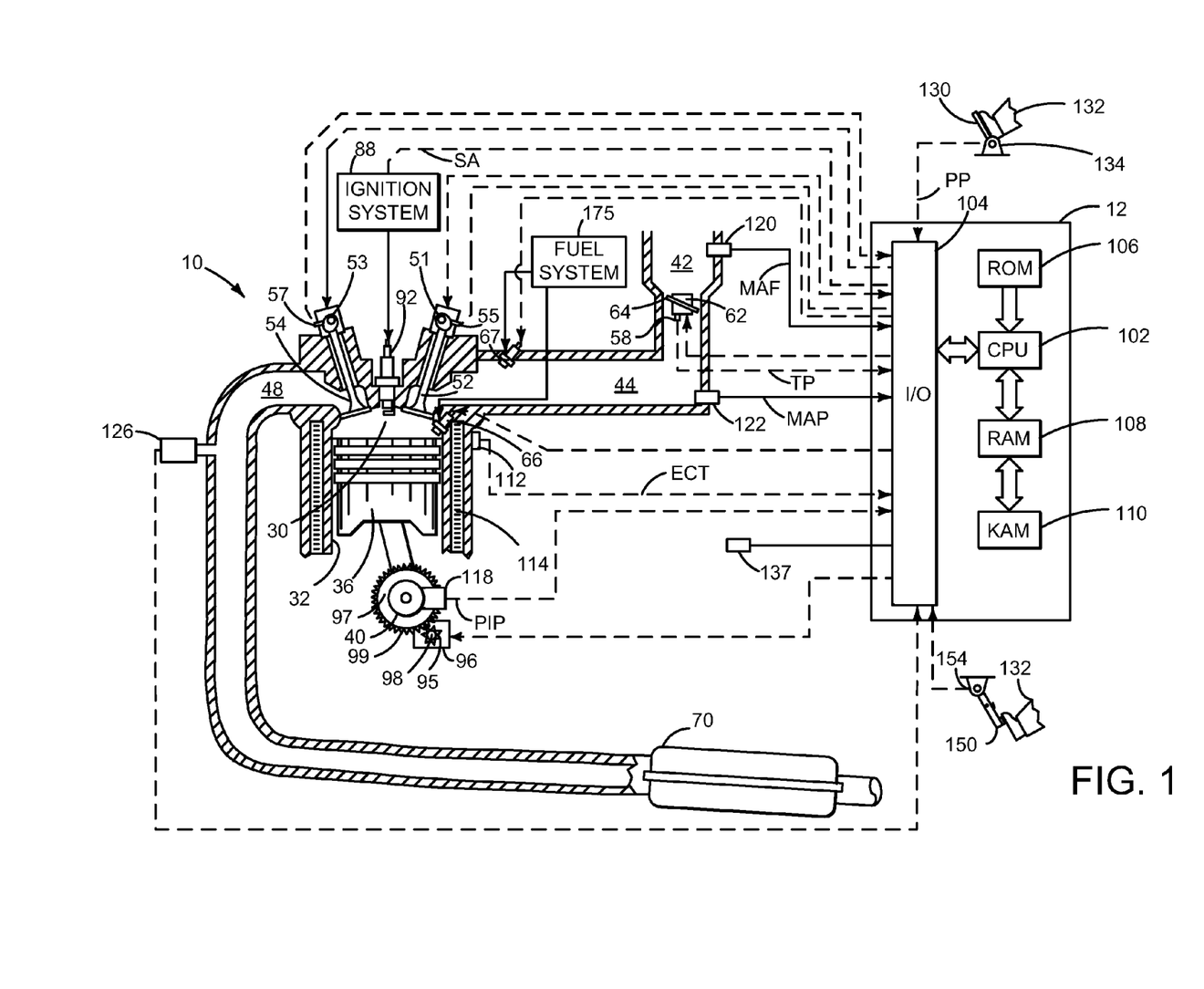
FIG. 1 is a schematic diagram of an engine.

The present description is related to controlling fuel vapors of a vehicle. The fuel vapors may be used in an engine as shown in FIG. 1. The engine may be supplied fuel from one or more fuel tanks as shown in the fuel systems of FIGS. 2-6. Component fuels may be separated from a fuel mixture comprising two or more fuels via diurnal heating and cooling of vehicle fuel systems. The vehicle fuel systems may be arranged to allow higher octane fuel vapors to condense only in fuel tank storing a higher octane fuel so that the possibility of unintended fuel mixing may be reduced. The method of FIGS. 7 and 8 operates the vehicle fuel system in a way that reduces the possibility of mixing fuels via the evaporative emissions section of the vehicle fuel system.

Referring to FIG. 1, internal combustion engine 10, comprising a plurality of cylinders, one cylinder of which is shown in FIG. 1, is controlled by electronic engine controller 12. Electrical connections between controller 12 and the various sensors and actuators are indicated by dashed lines.

Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175 shown in greater detail in FIGS. 2 and 3. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when driver 132 applies brake pedal 150; a measurement of ambient temperature via temperature sensor 137; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
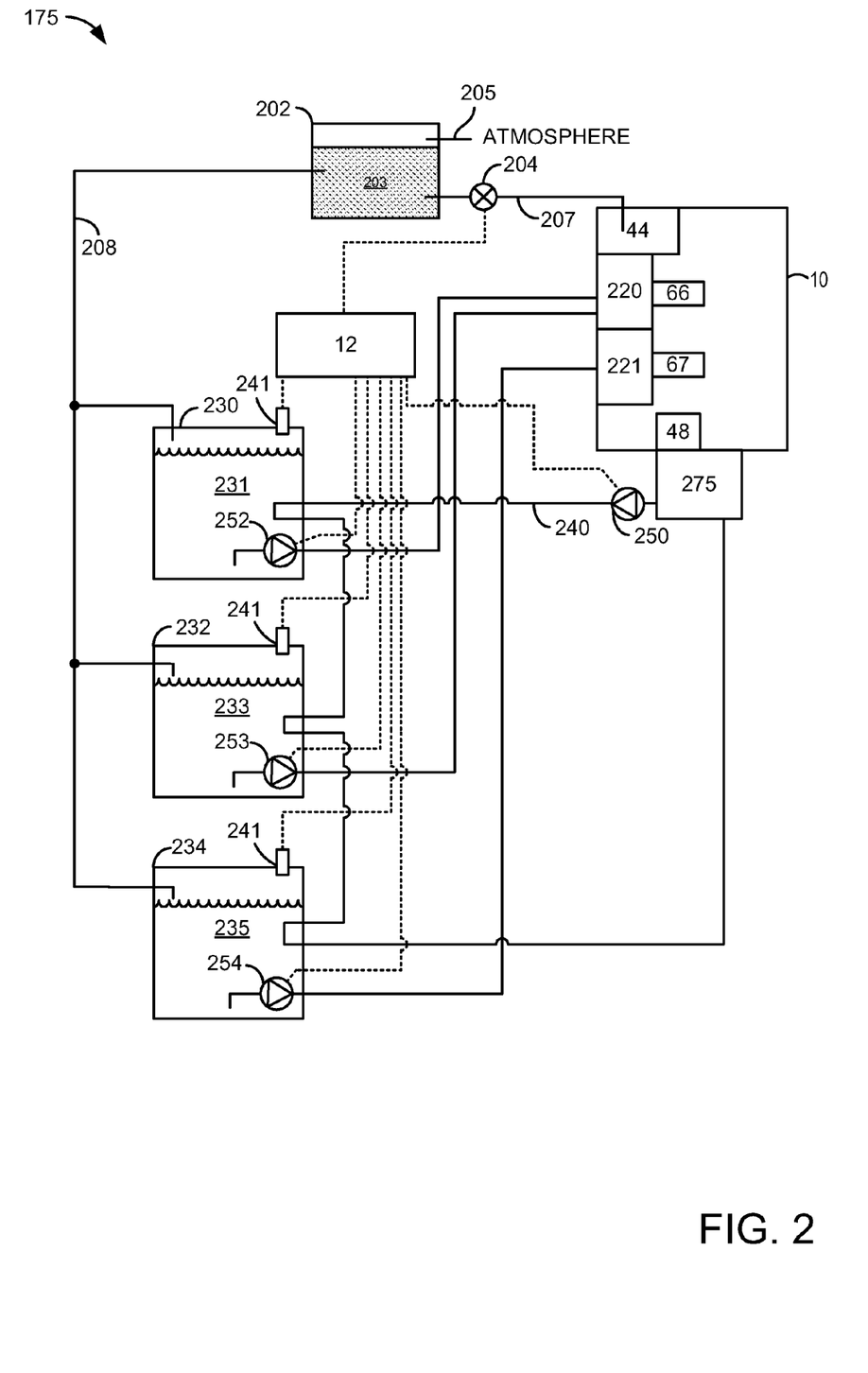
FIGS. 2-6 show example vehicle fuel systems.

Referring now to FIG. 2, a first example fuel system 175 is shown in detail. The fuel system of FIG. 2 may supply fuel to engine 10 shown in detail in FIG. 1. The system of FIG. 2 may be operated according to the method of FIG. 7. Fuel system components and fluidic conduits are shown as solid lines and electrical connections are shown as dashed lines. The conduits represented by solid lines in FIGS. 2-6 provide fluidic communication between devices linked by the conduits. Further, the conduits are coupled to the devices from which and to which they lead.

Fuel system 175 includes a fuel vapor storage canister 202 for storing fuel vapors. Fuel system 175 includes carbon 203 for storing and releasing fuel vapors. Fuel vapors stored in fuel vapor storage canister 202 may have a higher octane number than liquid fuel stored in one or more fuel tanks that supply fuel vapors to fuel vapor storage canister 202. Fuel vapor storage canister 202 is shown including atmospheric vent 205 which allows air to flow into and out of fuel vapor storage canister 202. Fuel vapors may be supplied to fuel vapor storage canister 202 via conduit 208 and fuel tanks 230, 232, and 234. Although three fuel tanks are shown, alternative examples may include fewer or additional fuel tanks without departing from the scope or intent of this description. Fuel vapors may be purged via purge valve 204 which allows fluidic communication between fuel vapor storage canister 202 and engine intake manifold 44 or intake 42 via conduit 207. Fuel system connections between fuel tanks 230, 232, 234 and fuel vapor storage canister 202 are minimized between fuel tanks 230, 232, 234 and conduit 208.

Engine 10 includes a first fuel rail 220 that supplies fuel to direct fuel injector 66. Engine 10 also includes a second fuel rail 221 that supplies fuel to port fuel injector 67. Fuel vapors may be inducted into intake manifold 44 or intake 42 when intake manifold pressure is below atmospheric pressure. In some examples, engine coolant or exhaust gases from exhaust manifold 48 may transfer heat energy to a fluid via heat exchanger 275. The fluid may be directed to fuel tanks 230, 232, and 234 via conduit 240 and pump 250. The heated fluid may increase the temperature of fuels 231, 233, and 235 to increase a rate of vapor separation from the respective fuels.

In one example, fuel tank 230 is a fuel tank that holds a higher octane fuel. Fuel tank 232 holds a middle level octane fuel that has an octane number between the fuel stored in fuel tank 230 and the fuel stored in fuel tank 234. Fuel tank 234 holds a lower level octane fuel that has an octane number that is less than the fuels stored on fuel tanks 230 and 232. Fuel tank 230 supplies fuel liquid 231 to fuel rail 220 and direct injector 66 via fuel pump 252. Fuel tank 232 supplies liquid fuel 233 to fuel rail 220 and direct injector 66 via fuel pump 253. Fuel tank 234 supplies liquid fuel 235 to fuel rail 221 and port injector 67 via fuel pump 254.

Fuel vapors from fuel tank 230 may be directed to fuel vapor storage canister 202 from fuel tank 230 via conduit 208. Fuel vapors from fuel tank 232 may be directed to fuel vapor storage canister 202 from fuel tank 232 via conduit 208. Fuel vapors from fuel tank 234 may be directed to fuel vapor storage canister 202 from fuel tank 234 via conduit 208. Thus, fuel vapors from fuel tanks 230, 232, and 234 may flow to fuel vapor storage canister 202 via conduit 208.

Controller 12 may receive inputs from the sensors described in FIG. 1 as well as sensors 241. In one example, sensors 241 may be temperature sensors. Alternatively, sensors 241 may be pressure sensors. Controller 12 also activates and deactivates purge valve 204 in response to fuel system and engine operating conditions. Additionally, controller 12 selectively operates pump 250 to increase the production of fuel tank vapors.

Figure 7:
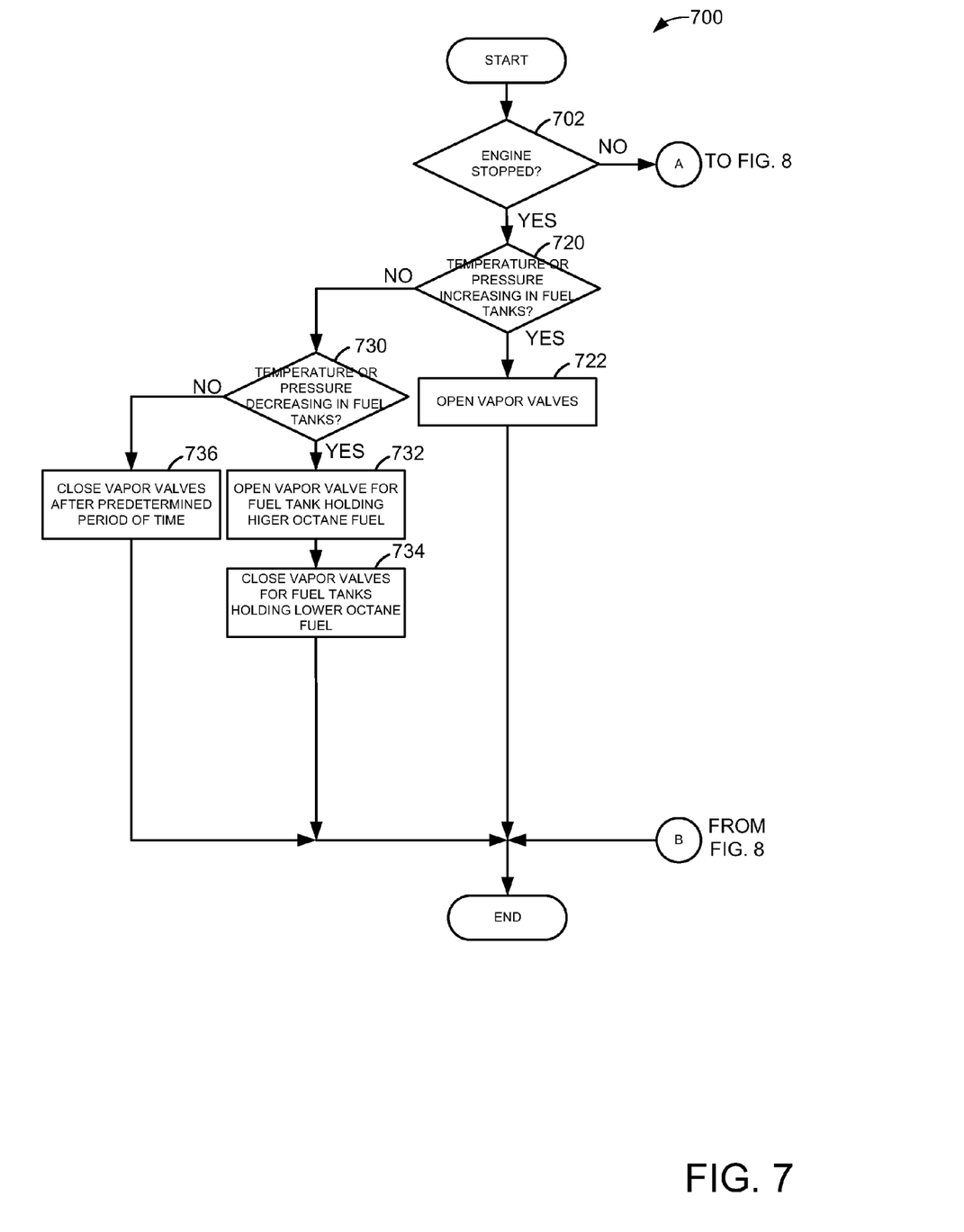
FIGS. 7 and 8 show an example method for operating a fuel system of a vehicle.
Figure 8:
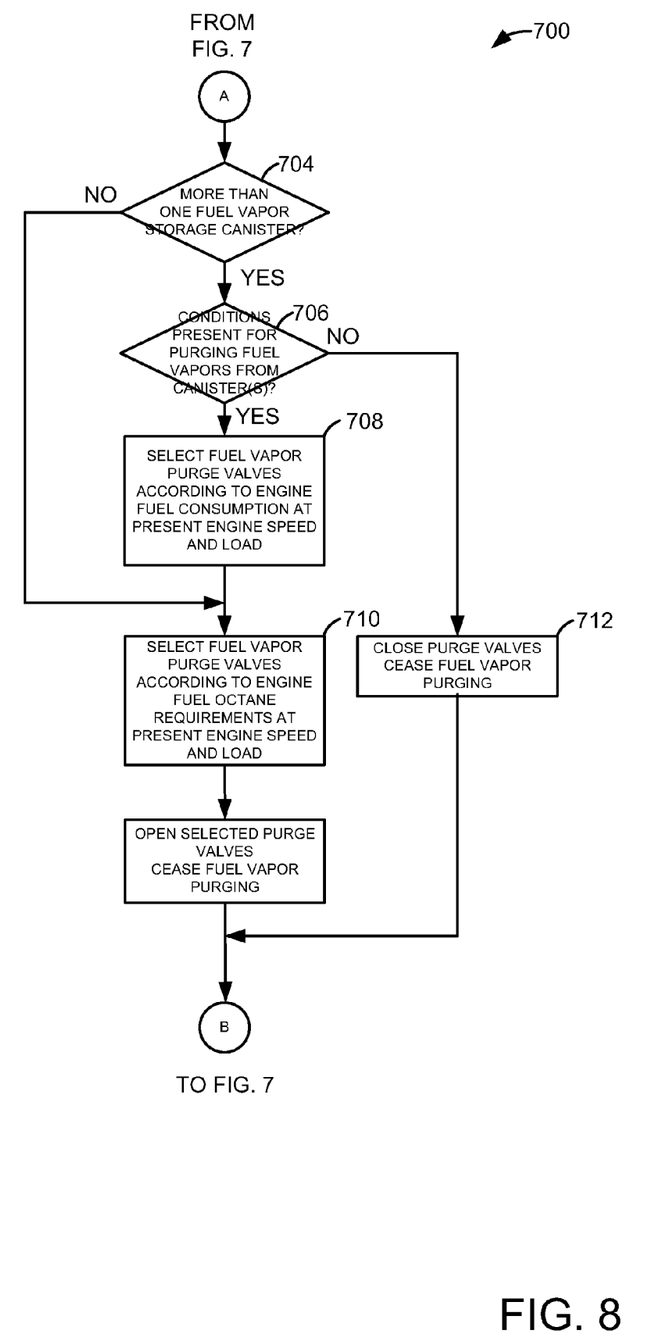

In one example, the system of FIG. 2 operates according to the method of FIG. 7 via executable instructions stored in non-transitory memory of controller 12. While engine 10 is operating, fuel vapors from fuel tanks 230, 232, and 234 may be stored in fuel vapor storage canister 202 in response to temperatures in the fuel tanks increasing, which motivates fuel vapor flow from each of fuel tanks 230, 232, and 234 to fuel vapor storage canister 202.

Fuel vapors from fuel tanks 230, 232, and 234 push air out of atmospheric vent 205 and are stored by carbon 203 when temperature and/or pressure in fuel tanks 230, 232, and 234 is increasing. If engine 10 is operating while vapors are being directed to fuel vapor storage canister 202, fuel vapor purge valve 204 may be opened so that fuel vapors are drawn into and combusted in engine 10. If engine 10 is not operating or if fuel vapor purge valve 204 is closed, fuel vapor may flow into fuel vapor storage canister 202 if temperature and/or pressure in one or more of fuel tanks 230, 232, and 234 increases such that fuel vapors flow to and are stored in fuel vapor storage canister 202.

On the other hand, if engine 10 is not operating or if fuel vapor purge valve is closed while temperature and/or pressure in fuel tanks 230, 232, and 234 are decreasing, fuel vapors from fuel vapor canister 202 may condense in each of fuel tanks 230, 232, and 234. Thus, the fuel system shown in FIG. 2 provides minimal connections between fuel tanks 230, 232, and 234; however, the configuration of FIG. 2 may allow higher octane fuel vapors to condense in fuel tanks holding or storing lower octane fuel. Consequently, diurnal fuel separation that may occur during fuel system heating may be made less efficient by diurnal fuel mixing that may occur during fuel system cooling. Similarly, higher octane fuel that may be separated via engine waste heat may be remixed in fuel tanks storing lower octane fuels.

Figure 3:
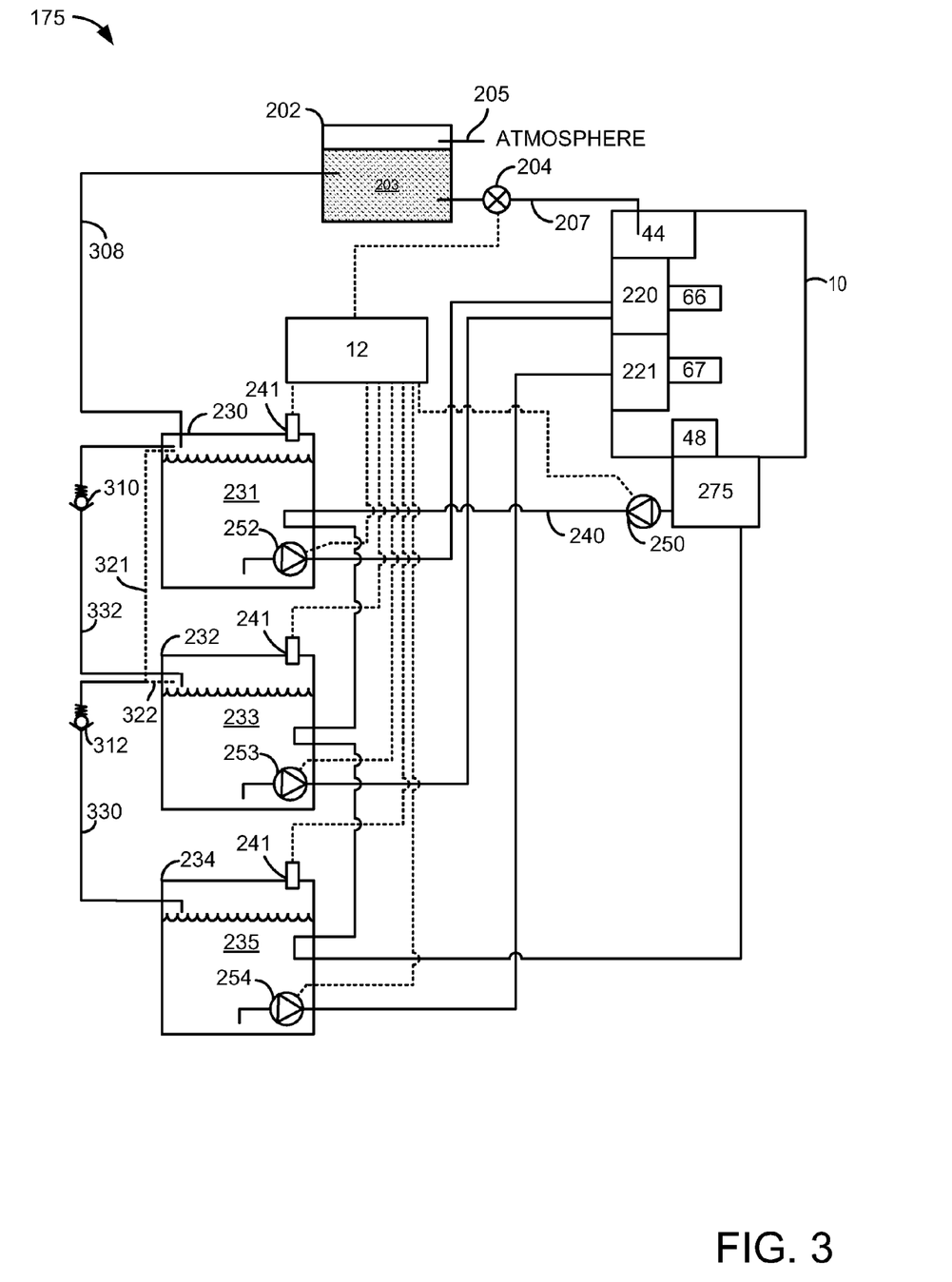

Referring now to FIG. 3, an alternative example fuel system 175 is shown in detail. The fuel system of FIG. 3 may supply fuel to engine 10 shown in detail in FIG. 1. The system of FIG. 3 may be operated according to the method of FIG. 7. Fuel system components and fluidic conduits that allow fluidic communication are shown as solid lines while electrical connections are shown as dashed lines. Fuel system devices and components shown in FIG. 3 that have the same numerical identifiers as devices and components shown in FIG. 2, are equivalent and operate as described in FIG. 2. For example, fuel tank 230 stores a higher octane fuel than fuel tanks 232 and 234. Therefore, the descriptions of fuel system components that are described in FIG. 2 are omitted for the sake of brevity.

In this example, fuel tanks 230, 232, and 234 are not coupled to a lone conduit that communicates with fuel vapor storage canister 202. Rather, fuel tanks 230, 232, and 234 are coupled in a cascaded one coupling after the other coupling configuration. In particular, fuel tank 234 is coupled to only to fuel tank 232 via conduit 330 and conduit 322. However, in some examples fuel tank 234 may be coupled to only fuel tank 230 via conduit 330 and optional conduit 321. Further, conduit 330 includes check valve 312 which limits and/or stops flow of fuel vapors from fuel tank 232 to fuel tank 234, but allows fuel vapors to flow from fuel tank 234 to fuel tank 232. The fuel system of FIG. 3 also includes conduit 332 which couples only fuel tank 232 to fuel tank 230. Conduit 332 also includes check valve 310, which limits and/or stops flow of fuel vapors from fuel tank 230 to fuel tank 232, but allows fuel vapors to flow from fuel tank 232 to fuel tank 231. Conduit 308 solely couples fuel tank 230 to fuel vapor storage canister 202.

Thus, fuel vapors separated from fuel tank 234 during diurnal fuel system heating or via engine waste heat may be routed to fuel tank 232, or optionally fuel tank 230, without fuel vapors being returned to fuel tank 234. Likewise, fuel vapors separated from fuel tank 232 and fuel vapors from fuel tank 234 during diurnal fuel system heating or via engine waste heat may be routed to fuel tank 230 without fuel vapors being returned to fuel tank 232. Fuel vapors may flow back and forth between fuel tank 230 and fuel vapor storage canister 202 during diurnal heating and cooling. In this way, fuel vapors from fuel tanks of a fuel system may be limited or restricted from returning to a fuel tank from which the fuel vapors originated after the fuel vapors leave the fuel tank from which they originated.

Figure 4:
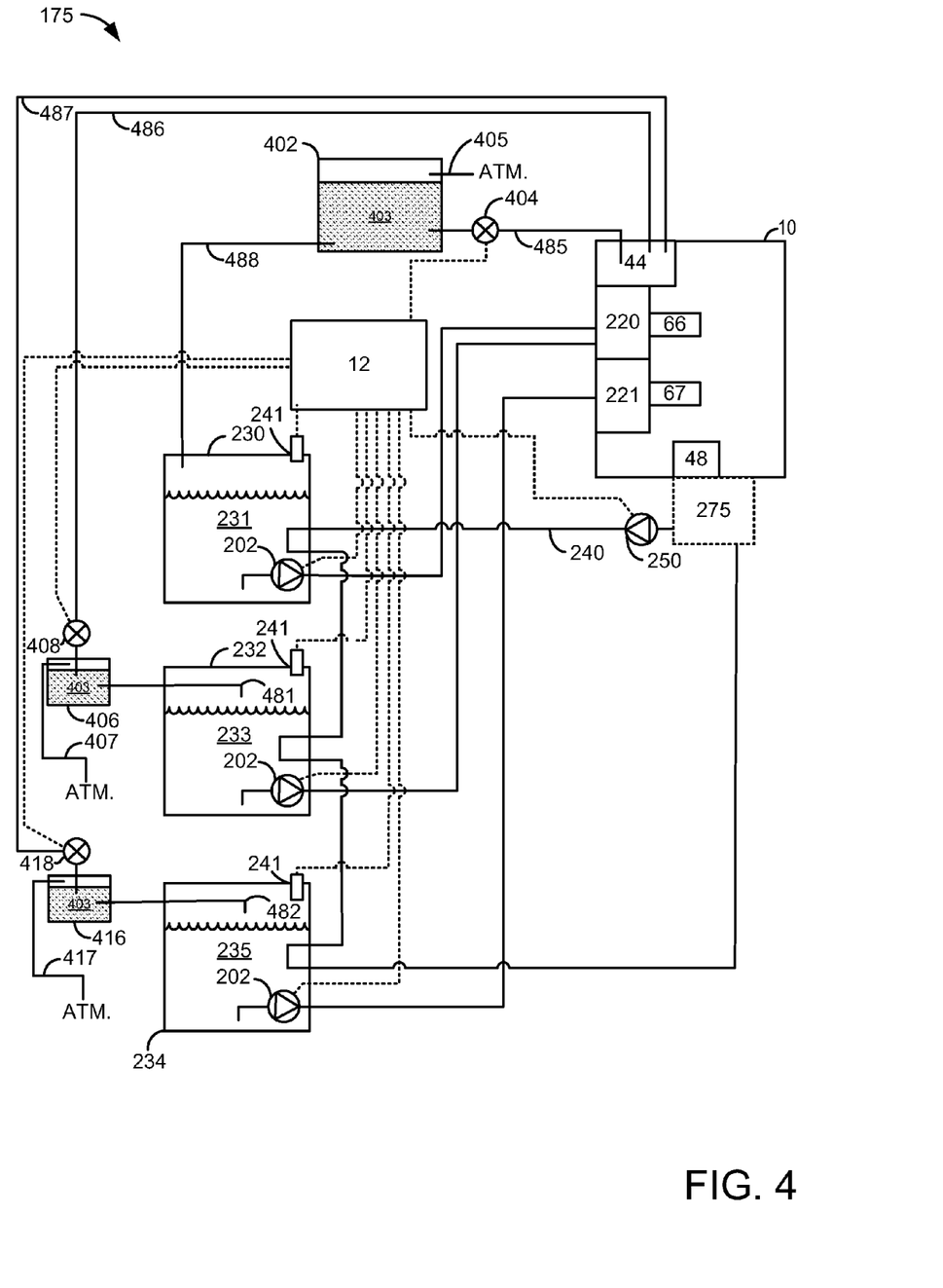

Referring now to FIG. 4, another alternative example fuel system 175 is shown in detail. The fuel system of FIG. 4 may supply fuel to engine 10 shown in detail in FIG. 1. The system of FIG. 4 may be operated according to the method of FIG. 7. Fuel system components and fluidic conduits that allow fluidic communication are shown as solid lines while electrical connections are shown as dashed lines. Fuel system devices and components shown in FIG. 4 that have the same numerical identifiers as devices and components shown in FIG. 2, are equivalent and operate as described in FIG. 2. For example, fuel tank 230 stores a higher octane fuel than fuel tanks 232 and 234. Therefore, the descriptions of fuel system components that are described in FIG. 2 are omitted for the sake of brevity.

In this example, fuel system 175 includes three fuel vapor storage canisters 402, 406, and 416; however the number of fuel vapor storage canisters may increase or decrease if the number of fuel tanks is increased or decreased as is mentioned in the system of FIG. 2. Each fuel vapor storage canister includes carbon 403 for storing fuel vapors. First fuel vapor storage canister 402 includes an atmospheric vent 405. Additionally, fuel vapor storage canisters 406 and 416 include respective atmospheric vents 407 and 417. First fuel vapor storage canister 402 is shown in direct fluidic communication with fuel tank 230 via conduit 488.

Fuel vapor storage canister 402 may be purged of fuel vapors via opening purge valve 404 to allow fluidic communication between fuel vapor storage canister 402 and engine intake manifold 44 via conduit 485. Similarly, fuel vapor storage canister 406 may be purged of fuel vapors via opening purge valve 408 to allow fluidic communication between fuel vapor storage canister 406 and engine intake manifold 44 via conduit 486. Likewise, fuel vapor storage canister 416 may be purged of fuel vapors via opening purge valve 418 to allow fluidic communication between fuel vapor storage canister 416 and engine intake manifold 44 via conduit 487. Thus, fuel vapors from each of fuel tanks 230, 232, and 234 are isolated from the other fuel tanks in fuel system 175.

In one example, the system of FIG. 4 operates according to the method of FIG. 7 via executable instructions stored in non-transitory memory of controller 12. While engine 10 is operating, fuel vapors from fuel tank 230 may be stored in fuel vapor storage canister 402. Fuel vapors from fuel tank 232 may be stored in fuel vapor storage canister 406, and fuel vapors from fuel tank 234 may be stored in fuel vapor storage canister 416. Fuel vapors may be stored in fuel vapor storage canisters 402, 406, and 416 when the engine is operating at conditions where fuel vapors are not being accepted by the engine (e.g., during deceleration fuel cut-out). When fuel vapors may be combusted by the engine, vapor purge valves 404, 408, and/or 418 may be opened to allow fuel vapors to flow to engine intake manifold 44 from the respective fuel vapor storage canisters 402, 406, and 416.

In one example, fuel vapors from one or more of fuel vapor storage canisters 402, 406, and 416 may be allowed to flow to engine 10 only during conditions where higher octane fuel is supplied to the engine in response to engine speed and load conditions or when engine knock is determined present. However, if it is determined that one or more of canisters 402, 406, and 416 has stored more than a predetermined threshold hydrocarbon storage capacity (e.g., 85% of the canister's hydrocarbon storage capacity), the purge valve corresponding to the fuel vapor storage canister at the threshold hydrocarbon storage capacity may be opened to allow the fuel vapor storage canister to be purged. For example, if fuel vapor storage canister 406 is determined to have stored an amount of hydrocarbons above the predetermined threshold hydrocarbon storage capacity, vapor purge valve 408 may be opened to reduce the amount of stored fuel vapor in fuel vapor storage canister 406. Further, vapor purge valve 408 may be opened when engine speed and load are in a range where a higher octane fuel is supplied to the engine to limit the possibility of engine knock.

If engine 10 is off (e.g., not rotating) or not accepting fuel vapors (e.g., purge valve 408 is closed), and if temperature and/or pressure is increasing in fuel tank 232 fuel vapors exit fuel tank 232 and enter fuel vapor storage canister 406, thereby reducing fuel system vapor pressure. Similarly, if engine 10 is off or not accepting fuel vapors (e.g., purge valve 418 is closed), and if temperature and/or pressure is increasing in fuel tank 234 fuel vapors exit fuel tank 234 and enter fuel vapor storage canister 416, thereby reducing fuel system vapor pressure. Increasing fuel temperature and/or pressure in fuel tank 230 causes fuel vapors from fuel tank 230 to enter fuel vapor storage canister 402. Purge valves 404, 408, and 418 may be operated independently or at the same time.

On the other hand, if engine 10 is not operating or accepting fuel vapors while temperature and/or pressure in fuel tanks 230, 232, and 234 are decreasing, fuel vapors stored in each fuel vapor storage canister 402, 406, and 416 may return to the fuel tank from which they originated. Air may be drawn into fuel vapor storage canisters 402, 406, and 416 via their respective atmospheric vents 405, 407, and 417 when fuel system cooling reduces the amount of vapor in the fuel system.

In this way, higher octane fuel vapors that have separated from fuel 233 and fuel 235 may condense in the fuel tanks from which they originated without condensing in other fuel tanks in fuel system 175. Thus, higher octane fuel vapors that may be produced via diurnal temperature increases in the fuel system may be recovered in the tank from which the fuel vapors originated. Although, recovering fuel vapors in the fuel tank from which the fuel vapors originated may not always be desired, fuel vapors from fuel tanks storing higher octane fuel are prevented from entering fuel tanks storing lower octane fuels. Therefore, fuel in the fuel tank storing the higher octane fuel may provide the benefits of combusting a higher octane fuel without a reduced possibility of creating engine knock because the octane number of the fuel in the fuel tank storing higher octane fuel may not be reduced as much as if the higher octane fuel vapors were permitted to condense in a fuel tank holding or storing lower octane fuel. Fuel vapors that condense in each of fuel tanks 230, 232, and 234 may be injected to engine 10 as liquid fuel.

Further, fuel vapors may enter fuel vapor storage canister 402 only from fuel tank 230. Fuel vapors may enter fuel vapor storage canister 406 only from fuel tank 232. Fuel vapors may enter fuel vapor storage canister 416 only from fuel tank 234. Fuel vapors may exit fuel vapor storage canister 402 and flow only to the engine via purge valve 404 and engine vacuum or to fuel tank 230 via diurnal cooling of fuel in fuel tank 230. Fuel vapors from fuel vapor canister 402 are prevented from entering fuel tanks 232 and 234 since there is no fluidic communication between vapor canister 402 and fuel tanks 232 and 234. Closing purge valves 404, 408, and 418 prevents fuel vapors from entering engine intake manifold 44 during diurnal cooling of fuel in the fuel system.

Figure 5:
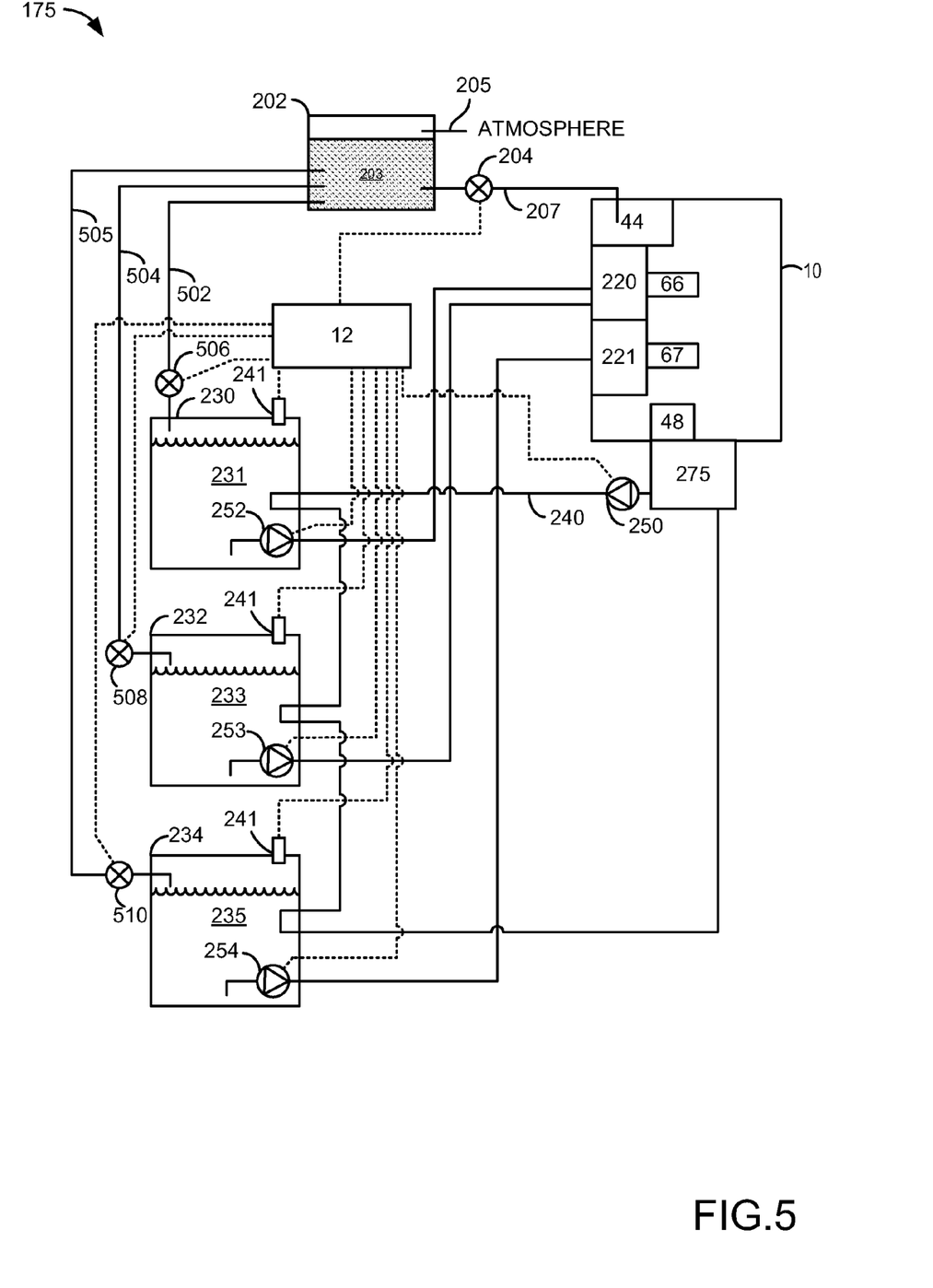

Referring now to FIG. 5, another alternative example fuel system 175 is shown in detail. The fuel system of FIG. 5 may supply fuel to engine 10 shown in detail in FIG. 1. The system of FIG. 5 may be operated according to the method of FIG. 7. Fuel system components and fluidic conduits that allow fluidic communication are shown as solid lines while electrical connections are shown as dashed lines. Fuel system devices and components shown in FIG. 5 that have the same numerical identifiers as devices and components shown in FIG. 2, are equivalent and operate as described in FIG. 2. Therefore, the descriptions of fuel system components that are described in FIG. 2 are omitted for the sake of brevity.

Fuel system 175 includes a fuel vapor storage canister 202 for storing fuel vapors. Fuel vapors may be supplied to fuel vapor storage canister 202 via conduits 505, 504, and 502 which are in fluidic communication with fuel tanks 230, 232, and 234. Although three fuel tanks are shown, alternative examples may include fewer or additional fuel tanks without departing from the scope or intent of this description. Fuel vapors may be purged via purge valve 204 which allows fluidic communication between fuel vapor storage canister 202 and engine intake manifold 44.

Fuel vapors from fuel tank 230 may be directed to fuel vapor storage canister 202 from fuel tank 230 via fuel vapor valve 506. Fuel vapors from fuel tank 232 may be directed to fuel vapor storage canister 202 from fuel tank 232 via fuel vapor valve 508. Fuel vapors from fuel tank 234 may be directed to fuel vapor storage canister 202 from fuel tank 234 via fuel vapor valve 510.

Controller 12 may receive inputs from the sensors described in FIG. 1 as well as sensors 241. In one example, sensors 241 may be temperature sensors. Alternatively, sensors 241 may be pressure sensors. Controller 12 also activates and deactivates fuel vapor valves 506, 508, and 510 in response to fuel system and engine operating conditions. Controller 12 also activates and deactivates fuel vapor purge valve 204 in response to fuel system and engine operating conditions. Additionally, controller 12 selectively operates pump 250 to increase the production of fuel tank vapors.

In one example, the system of FIG. 2 operates according to the method of FIG. 7 via executable instructions stored in non-transitory memory of controller 12. While engine 10 is operating, fuel vapors from fuel tanks 230, 232, and 234 may be stored in fuel vapor storage canister 202 via opening fuel vapor valves 506, 508, and 510. Fuel vapor valves 506, 508, and 510 may be opened in response to temperatures within fuel tanks 230, 232, and 234 exceeding individual threshold temperatures that are based on the fuel type stored in the respective fuel tanks. Alternatively, fuel vapor valves 506, 532, and 534 may be opened in response to pressures within fuel tanks 230, 232, and 234 exceeding individual threshold pressures that are based on the fuel type store in the respective fuel tanks.

Fuel vapors from fuel tanks 230, 232, and 234 push air out of atmospheric vent 205 and are stored by carbon 203 when temperature and/or pressure in fuel tanks 230, 232, and 234 is increasing. If engine 10 is operating while vapors are being directed to fuel vapor storage canister 202, fuel vapor purge valve 204 may be opened so that fuel vapors are drawn into and combusted in engine 10. If engine 10 is not operating or if fuel vapor purge valve 204 is closed, fuel vapor valves 506, 508, and 510 may be opened if temperature and/or pressure in fuel tanks 230, 232, and 234 are increasing so that fuel vapors may be stored in fuel vapor storage canister 202.

On the other hand, if engine 10 is not operating or if fuel vapor purge valve is closed while temperature and/or pressure in fuel tanks 230, 232, and 234 are decreasing, fuel vapor valves 508 and 510 may be closed so that fuel vapors stored in fuel vapor storage canister 202 may be released to fuel tank 230. In this way, higher octane fuel vapors that have separated from fuel 233 and fuel 235 may condense and be stored in fuel tank 230. Fuel vapors from fuels 233 and 235 may have higher octane numbers than fuels 233 and 235. Thus, higher octane fuel vapors that may be produced via diurnal temperature changes in the fuel system may be recovered and stored to a fuel tank that holds higher octane fuel so that higher octane fuel components remain separated from lower octane fuels during fuel system heating and cooling. Higher octane fuel vapor that condenses in fuel tank 230, which stores higher octane fuel, may also be injected to engine 10 via fuel injector 66.

Further, fuel vapors may enter fuel vapor storage canister 202 only from fuel tanks 230, 232, and 234. Fuel vapors may exit fuel vapor storage canister 202 and flow only to the engine via purge valve 204 and engine vacuum or to fuel tank 230 via diurnal cooling of fuel in fuel tank 230 when vapor valve 230 is open. Fuel vapors from fuel vapor canister 202 are prevented from entering fuel tanks 232 and 234 during diurnal cooling via closing vapor valves 508 and 510. Closing vapor valves 508 and 510 also prevents fuel vapors from fuel tank 232 from entering fuel tank 234 and vise-versa during diurnal cooling of fuel in the fuel system.

Figure 6:
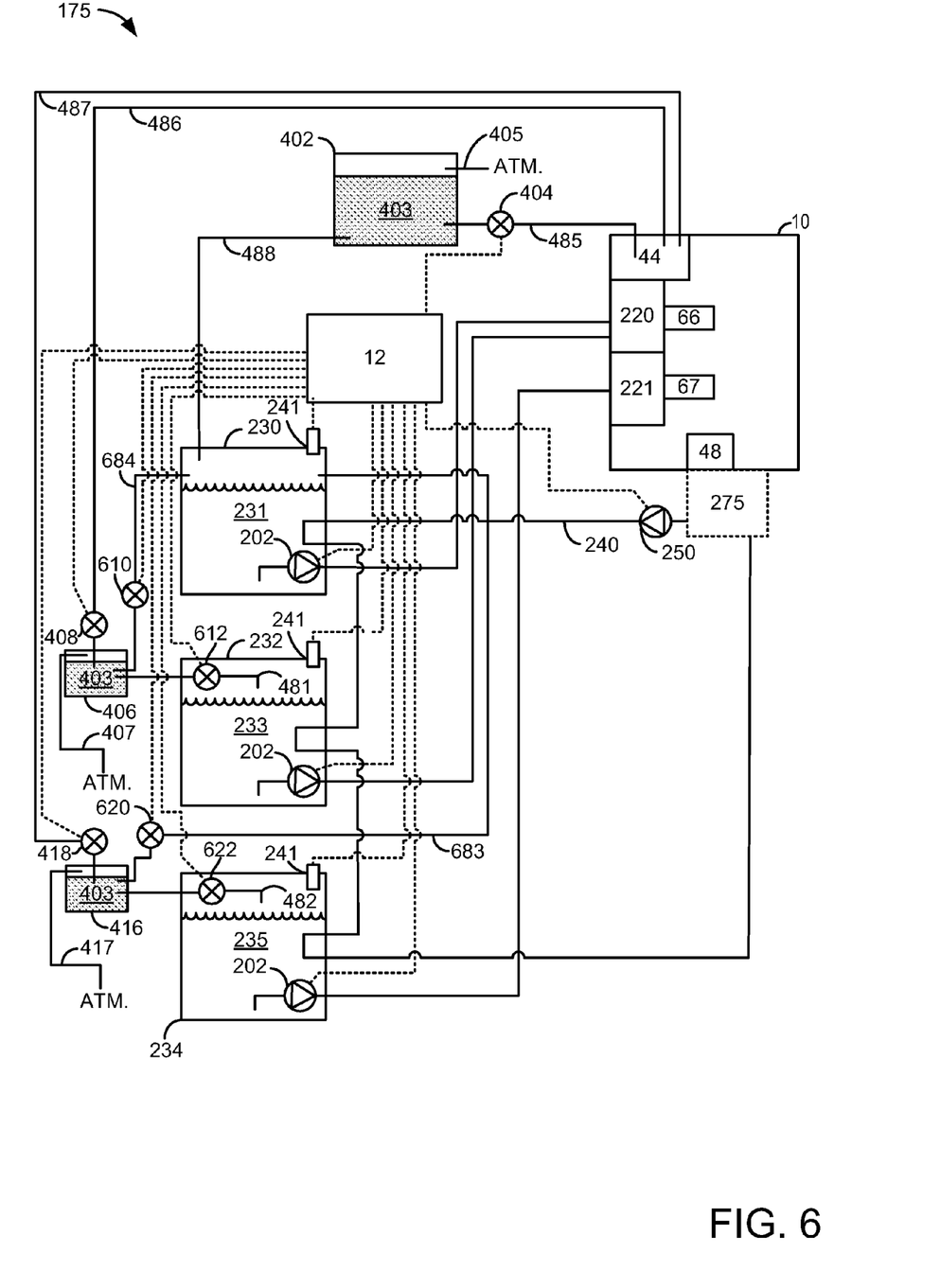

Referring now to FIG. 6, another alternative example fuel system 175 is shown in detail. The fuel system of FIG. 6 may supply fuel to engine 10 shown in detail in FIG. 1. The system of FIG. 6 may be operated according to the method of FIG. 7. Fuel system components and fluidic conduits that allow fluidic communication are shown as solid lines while electrical connections are shown as dashed lines. Fuel system devices and components shown in FIG. 6 that have the same numerical identifiers as devices and components shown in FIGS. 2 and 4, are equivalent and operate as described in FIGS. 2 and 4. Therefore, the descriptions of fuel system components that are described in FIGS. 2 and 4 are omitted for the sake of brevity.

In this example, fuel system 175 includes three fuel vapor storage canisters 402, 406, and 416; however the number of fuel vapor storage canisters may increase or decrease if the number of fuel tanks is increased or decreased as is mentioned in the system of FIG. 2. Each fuel vapor storage canister includes carbon 403 for storing fuel vapors. First fuel vapor storage canister 402 includes an atmospheric vent 405. Additionally, fuel vapor storage canisters 406 and 416 include respective atmospheric vents 407 and 417. Second fuel vapor storage canister 406 may be in fluidic communication with fuel tank 230 via conduit 684 when fuel vapor valve 610 is open. Third fuel vapor storage canister 416 may also be in fluidic communication with fuel tank 230 via conduit 683 when fuel vapor valve 620 is open. Fuel vapors produced in fuel tank 232 may be routed to fuel vapor storage canister 406 via conduit 481 when fuel vapor valve 612 is in an open state so as to allow fluidic communication between fuel tank 232 and fuel vapor storage canister 406. Similarly, fuel vapors produced in fuel tank 234 may be routed to fuel vapor storage canister 416 via conduit 482 when fuel vapor valve 622 is in an open state so as to allow fluidic communication between fuel tank 234 and fuel vapor storage canister 416. First fuel vapor storage canister 402 is shown in direct fluidic communication with fuel tank 230 via conduit 488.

Fuel vapor storage canister 402 may be purged of fuel vapors via opening purge valve 404 to allow fluidic communication between fuel vapor storage canister 402 and engine intake manifold 44 via conduit 485. Similarly, fuel vapor storage canister 406 may be purged of fuel vapors via opening purge valve 408 to allow fluidic communication between fuel vapor storage canister 406 and engine intake manifold 44 via conduit 486. Likewise, fuel vapor storage canister 416 may be purged of fuel vapors via opening purge valve 418 to allow fluidic communication between fuel vapor storage canister 416 and engine intake manifold 44 via conduit 487.

In one example, the system of FIG. 6 operates according to the method of FIG. 4 via executable instructions stored in non-transitory memory of controller 12. While engine 10 is operating, fuel vapors from fuel tank 230 may be stored in fuel vapor storage canister 402. Fuel vapors from fuel tank 232 may be stored in fuel vapor storage canister 406, and fuel vapors from fuel tank 234 may be stored in fuel vapor storage canister 416. Fuel vapors may be stored in fuel vapor storage canisters 402, 406, and 416 when the engine is operating at conditions where fuel vapors are not being accepted by the engine (e.g., during deceleration fuel cutout). When fuel vapors may be combusted by the engine, vapor purge valves 404, 408, and/or 418 may be opened to allow fuel vapors to flow to engine intake manifold 44 from the respective fuel vapor storage canisters 402, 406, and 416.

In one example, fuel vapors from one or more of fuel vapor storage canisters 402, 406, and 416 may be allowed to flow to engine 10 only during conditions where higher octane fuel is supplied to the engine in response to engine speed and load conditions or when engine knock is determined present. However, if it is determined that one or more of canisters 402, 406, and 416 has stored more than a predetermined threshold hydrocarbon storage capacity (e.g., 85% of the canister's hydrocarbon storage capacity), the purge valve corresponding to the fuel vapor storage canister at the threshold hydrocarbon storage capacity may be opened to allow the fuel vapor storage canister to be purged. For example, if fuel vapor storage canister 406 is determined to have stored an amount of hydrocarbons above the predetermined threshold hydrocarbon storage capacity, vapor purge valve 408 may be opened to reduce the amount of stored fuel vapor in fuel vapor storage canister 406. Further, vapor purge valve 408 may be opened when engine speed and load are in a range where a higher octane fuel is supplied to the engine to limit the possibility of engine knock.

If engine 10 is off (e.g., not rotating) or not accepting fuel vapors, and if temperature and/or pressure is increasing in fuel tank 232 fuel vapor valve 612 may be opened to allow fuel vapors to exit fuel tank 232 and enter fuel vapor storage canister 406, thereby reducing fuel system vapor pressure. Similarly, if engine 10 is off or not accepting fuel vapors, and if temperature and/or pressure is increasing in fuel tank 234 fuel vapor valve 622 may be opened to allow fuel vapors to exit fuel tank 234 and enter fuel vapor storage canister 416, thereby reducing fuel system vapor pressure. Increasing fuel temperature and/or pressure in fuel tank 230 causes fuel vapors from fuel tank 230 to enter fuel vapor storage canister 402 since no purge valve is positioned along conduit 488. Fuel vapor valves 610, 620, 612, and 622 may be operated independently or at the same time. Likewise, purge valves 404, 408, and 418 may be operated independently or at the same time.

On the other hand, if engine 10 is not operating or accepting fuel vapors while temperature and/or pressure in fuel tanks 230, 232, and 234 are decreasing, fuel vapor valves 612 and 622 may be closed. Further, fuel vapor valves 610 and 620 may be opened so that fuel vapors stored in fuel vapor storage canisters 406 and 416 may be released to fuel tank 230. Opening vapor valve 610 and closing vapor valve 612 allows air to be drawn into fuel vapor storage canister via atmospheric vent 407 when fuel system cooling reduces the amount of vapor in the fuel system. Likewise, opening vapor valve 620 and closing vapor valve 622 allows air to be drawn into fuel vapor storage canister via atmospheric vent 417 when fuel system cooling reduces the amount of vapor in the fuel system.

In this way, higher octane fuel vapors that have separated from fuel 233 and fuel 235 may condense and be stored in fuel tank 230. Fuel vapors from fuels 233 and 235 may have higher octane numbers than fuels 233 and 235. Thus, higher octane fuel vapors that may be produced via diurnal temperature changes in the fuel system may be recovered and stored to a fuel tank that holds higher octane fuel so that higher octane fuel components remain separated from lower octane fuels during fuel system heating and cooling. Higher octane fuel vapor that condenses in fuel tank 230, which stores higher octane fuel, may also be injected to engine 10 via fuel pump 202 and fuel injector 66.

Further, fuel vapors may enter fuel vapor storage canister 402 only from fuel tanks 230, 232, and 234. Fuel vapors may exit fuel vapor storage canister 402 and flow only to the engine via purge valve 404 and engine vacuum or to fuel tank 230 via diurnal cooling of fuel in fuel tank 230. Fuel vapors from fuel vapor canister 402 are prevented from entering fuel tanks 232 and 234 during diurnal cooling via closing vapor valves 612 and 622. Closing vapor valves 612 and 622 also prevents fuel vapors from fuel tank 232 from entering fuel tank 234 and vice-versa during diurnal cooling of fuel in the fuel system. Likewise, closing vapor valve 612 during diurnal cooling prevents fuel vapors from passing from fuel vapor canister 406 into fuel tank 232. Closing vapor valve 622 during diurnal cooling prevents fuel vapors from passing from fuel vapor canister 416 to fuel tank 234.

In some examples, fuel vapor valve 610 may be replaced with a check valve that limits or prevents flow of fuel vapors from fuel tank 230 to fuel vapor storage canister 406 and that allows fuel vapors to flow from fuel vapor storage canister 406 to fuel tank 230. Similarly, fuel vapor valve 620 may be replaced with a check valve that limits or prevents flow of fuel vapors from fuel tank 230 to fuel vapor storage canister 416 and that allows fuel vapors to flow from fuel vapor storage canister 416 to fuel tank 230.

Thus, the fuel systems of FIGS. 2-6 may provide for a fuel storage system, comprising: a first fuel tank; a second fuel tank; a first fuel vapor storage canister; a second fuel vapor storage canister; a first conduit coupled to the first fuel tank and the first fuel vapor storage canister; a second conduit not coupled to the first conduit, the second conduit coupled to the first fuel tank and the second fuel vapor storage canister; and a valve positioned along the second conduit. The fuel vapor system where the first fuel tank stores a fuel having a higher octane number than a fuel stored in the second fuel tank, and where the first conduit provides fluidic communication between the first fuel tank and the first fuel vapor storage canister, and where the second conduit provides fluidic communication between the first fuel tank and the second fuel vapor storage canister.

In another example, the fuel system further comprises a third conduit coupled to the second fuel tank and the second fuel vapor storage canister. The fuel vapor storage system further comprises a valve positioned along the third conduit. The fuel storage system further comprises a fourth conduit, the fourth conduit coupled to an engine intake system and the second fuel vapor storage canister. The fuel storage system further comprises a fuel vapor purge valve positioned along the fourth conduit. The fuel storage system, further comprises a controller including executable instructions stored in non-transitory memory for limiting return of fuel vapors from the second fuel vapor storage canister to the second fuel tank.

The systems of FIGS. 2-6 may also provide a fuel vapor storage system, comprising: two or more fuel tanks, a first fuel tank of the two or more fuel tanks storing a fuel having a higher octane number than a remainder of the two or more fuel tanks; a conduit coupled to the first fuel tank and one of the remainder of the two or more fuel tanks; and a check valve positioned along the conduit biased to limit flow from the first fuel tank to the remainder of the two or more fuel tanks. The fuel storage system further comprises a fuel vapor storage canister and a conduit coupled to the fuel vapor storage canister and the first fuel tank, and where the conduit coupled to the fuel vapor storage canister is a sole conduit coupled to the fuel vapor storage canister and the two or more fuel tanks. The fuel storage system further comprises a conduit coupled to an engine waste heat exchanger and one or more of the two or more fuel tanks. The fuel storage system further comprises a fuel pump in fluidic communication with the first fuel tank and a direct fuel injector. The fuel storage system further comprises a fuel pump in fluidic communication with one of the two or more fuel tanks other than the first fuel tank and a port fuel injector.

Additionally, the systems of FIGS. 2-6 provide for a fuel vapor storage system, comprising: a first fuel tank storing a first fuel; a second fuel tank storing a second fuel, the second fuel including a lower octane number than the first fuel; a first fuel vapor storage canister in fluidic communication with the first fuel tank; and a controller including executable instructions stored in non-transitory memory for limiting flow of fuel vapors from the first fuel tank to the second fuel tank. The fuel vapor storage system further comprises a valve, and where limiting flow of fuel vapors is achieved via closing the valve.

In some examples, the fuel vapor storage system further comprises a first conduit coupled to the first fuel vapor storage canister and the first fuel tank, and a second conduit coupled to the first fuel vapor storage canister and the second fuel tank. The fuel vapor storage system further comprises a second fuel vapor storage canister, the second fuel vapor storage canister in fluidic communication with the second fuel tank and not in fluidic communication with the first fuel tank outside of an engine intake. The fuel vapor storage system further comprises two fuel vapor purge valves, a first fuel vapor purge valve of the two fuel vapor purge valves in fluidic communication with the first fuel vapor storage canister and an engine intake. The fuel vapor storage system further comprises a second fuel vapor purge valve of the two fuel vapor purge valves in fluidic communication with the second fuel vapor storage canister and the engine intake. The fuel vapor storage system further comprises additional controller instructions for allowing flow of fuel vapors from the second fuel tank to the first fuel tank during diurnal cooling of the fuel vapor storage system. The fuel vapor storage system further comprises additional controller instructions to inject condensed fuel in the first fuel tank to an engine, and where the condensed fuel originated from the second fuel tank.

Referring now to FIG. 7, a method for operating a fuel system of a vehicle is shown. The method of FIG. 7 may be stored as executable instructions in non-transitory memory a controller of a system as shown in FIG. 1. The method of FIG. 7 may be applied to the example fuel systems shown in FIGS. 2-6 as well as other fuel systems.

At 702, method 700 judges whether or not the engine is stopped. In one example, the engine may be judged to be stopped rotating if engine speed is zero. If method 700 judges that the engine is stopped, the answer is yes and method 700 proceeds to 720. Otherwise, the answer is no and method 700 proceeds to 704.

At 704, method 700 judges whether or not more than one fuel vapor storage canister is present in the fuel system (e.g., the fuel systems shown in FIGS. 4 and 6). In one example, method 700 may judge whether or not more than one fuel vapor storage canister is present in the fuel system based on a variable stored in controller memory that indicates the number of fuel vapor storage canisters in the vehicle fuel system. If method 400 judges that more than one fuel vapor storage canister is present in the fuel system, the answer is yes and method 700 proceeds to 706. Otherwise, the answer is no and method 700 proceeds to 710.

At 706, method 700 judges whether or not conditions are present for purging fuel vapors from fuel vapor storage canisters. The fuel system may include two or more fuel tanks and one or more fuel vapor storage canisters as shown in FIGS. 2-6. In one example, method 700 may judge that conditions are present for purging fuel vapors from fuel canisters when the engine is combusting air-fuel mixtures (e.g., one or more cylinders are activated), and when the amount of fuel vapors stored in a fuel vapor storage canister exceeds a threshold level of fuel. Alternatively, or in addition, conditions for fuel vapor purging may be judged to be present when temperature and/or pressure in one or more fuel tanks is greater than a threshold temperature or pressure, pressure in the intake manifold is below a threshold, etc. If method 700 judges that conditions are present for purging fuel vapors from the fuel vapor storage canisters, the answer is yes and method 700 proceeds to 708. Otherwise, the answer is no and method 700 proceeds to 712.

At 712, method 700 closes fuel system purge valves (e.g., purge valve 204 of FIGS. 2, 3, and 5, and purge valves 404, 408, and 418 of FIGS. 4 and 6). The fuel system purge valves may be closed to reduce the possibility of drawing fuel vapors into an engine that is not combusting an air-fuel mixture or during conditions where the engine may not operate as is desired if the purge valves are at least partially opened. Method 700 proceeds to exit after fuel vapor purge valves are closed.

At 708, method 700 selects fuel vapor purge valves in response to engine fuel consumption at the present engine speed and load conditions. U.S. patent application Ser. No. 14/019,362, filed on Sep. 5, 2013, titled VAPOR PURGING OCTANE SEPARATION SYSTEM, the entire contents of which are hereby incorporated by reference for all intents and purposes includes examples of purging fuel vapors from multiple fuel vapor storage canisters. In one additional example, fuel vapor purge valves are selected to be opened based on the amount of fuel vapor estimated stored in each of the fuel vapor storage canisters and engine fuel consumption. In particular, the number of fuel vapor purge valves opened is a number less than a number of open purge valves that will provide an amount of fuel less than is being consumed at the present engine operating conditions. For example, if the engine is consuming 8.0 Kg/hr of fuel, the fuel system has three fuel vapor storage canisters, and each fuel vapor storage canister has the capacity to output 3.0 Kg/hr for a period of time, method 700 opens two fuel vapor purge valves to provide 6.0 Kg/her to the engine. The additional 2.0 Kg/hr is injected to the engine in liquid form. In some examples, where the fuel vapor purge valves may be adjusted to a partially open state, the fuel vapor purge valves may be adjusted to provide the amount of fuel consumed by the engine at the present operating conditions. In other examples, the method of FIG. 7 may provide a desired fractional amount of fuel consumed by the engine at the present operating conditions. For example, if the engine is consuming 6 Kg/hr of fuel, the fuel vapor valves may be adjusted to provide 2 Kg/hr of fuel or thirty three percent of fuel consumed by the engine at present operating conditions. The number of fuel vapor valves opened corresponds to the number of fuel vapor valves that when opened provide the desired percentage of fuel supplied to the engine at present operating conditions. Method 700 proceeds to 710 after the number of fuel vapor purge valves to be opened is determined.

At 710, method 700 selects fuel vapor purge valves according to engine fuel octane requirements at the present engine speed and load. If a group or number of fuel vapor purge valves were selected at 708, method 700 selects fuel vapor purge valves from the group of fuel vapor purge valves selected at 708. Further, if the fuel system has more than one purge valve (e.g., FIGS. 4 and 6), a number of fuel purge valves less than the full complement of fuel purge valves may be opened in response to the amount of higher octane fuel the engine uses to while operating at the present engine speed and load.

For example, if the engine uses only a small amount of higher octane fuel at the present engine speed and load to limit the possibility of engine knock, only one of three fuel purging valves may be opened. The fuel flow rate through the selected purge valves is less than or equal to the amount of higher octane fuel determined to be used at the present engine operating conditions based on engine speed and load. If the engine does not use higher octane fuel at the present operating conditions, the fuel vapor purge valves are not opened unless fuel pressure and/or temperature in one of the fuel system fuel tanks is greater than a threshold pressure or temperature. However, if the engine uses a greater amount of higher octane fuel than all the fuel vapor purge valves may provide at the present engine operating conditions, all fuel vapor purge valves may be opened to fuel the engine and reduce the possibility of engine knock. In this way, higher octane fuel vapors may be conserved for engine operating conditions where use of higher octane fuel may be more beneficial (e.g., higher engine speeds and loads). The engine octane number requirement may increase as engine speed and/or load increase. Method 700 proceeds to 712 after fuel vapor purge valves are opened and closed in response to engine speed and load conditions.

At 712, method 400 opens selected fuel vapor purging valves to purge fuel vapors from the fuel system. The number of fuel vapor purge valves opened is based on engine fuel consumption at the present engine speed and load as well as engine fuel octane requirements at the present engine speed and load. Method 700 proceeds to exit after selected fuel vapor purging valves are opened.

At 720, method 700 judges whether or not temperature and/or pressure (e.g., fuel vapor temperature or fuel vapor pressure) in one or more of the fuel system fuel tanks is increasing. Temperature and/or pressure within a fuel system may be measured via sensors or estimated. If method 700 judges that temperature and/or pressure in one or more fuel tanks is increasing, the answer is yes and method 700 proceeds to 722. Otherwise, method 700 proceeds to 730.

Alternatively, method 700 may increase temperature and/or fuel pressure in one or more fuel tanks in response to a low amount of higher octane fuel or a low amount of fuel vapors stored in fuel vapor storage canisters at 720. The fuel tank temperature may be increased via circulating a fluid heated via engine exhaust gases or engine coolant to one or more fuel tanks. Method 700 proceeds to 722 if fuel tank heating is activated. Otherwise, method 700 proceeds to 730.

At 722, method 700 opens vapor valves. In particular, vapor valves that are in fluidic communication or associated with a fuel tank that is rising in temperature and/or pressure are opened. Vapor valves that are in fluidic communication or associated with fuel tanks where temperature and/or pressure are not rising may remain in a closed state.

For example, for the system of FIG. 5, if temperature in fuel tank 232 is increasing, fuel vapor valve 508 may be opened while fuel vapor valves 506 and 510 may remain closed when fuel temperature and/or pressure is not increasing in fuel tanks 230 and 234. Similarly, for the system of FIG. 6, if temperature in fuel tank 232 is increasing, fuel vapor valves 612 may be opened to allow fuel vapors into fuel vapor storage canister 406 while fuel vapor valves 610, 622, and 622 remain closed. On the other hand, if temperature and/or pressure is increasing in fuel tanks 230, 232, and 234, fuel vapor valves 612 and 622 may be opened while fuel vapor valves 610 and 620 are in a closed state so that fuel vapor from fuel tank 230 does not enter fuel vapor canisters 406 and 416. For the system shown in FIG. 3, check valves 310 and 312 open in response to increasing temperature and/or pressure in fuel tanks 232 and 234.

Thus, fuel vapor valves may be commanded to open depending on whether or not temperature and/or pressure is increasing in fuel tanks associated with the respective fuel vapor valves. Further, opening vapor valve 612 while fuel system temperature is increasing allows fuel vapors to flow from fuel tank 232 to fuel vapor canister 406 without fuel from fuel tanks 230 and 234 or fuel vapor canisters 416 and 402 from entering fuel tank 232. Likewise, opening vapor valve 622 while fuel system temperature is increasing allows fuel vapors to flow from fuel tank 234 to fuel vapor canister 416 without fuel from fuel tanks 230 and 232 or fuel vapor canisters 402 and 406 from entering fuel tank 234. Method 700 proceeds to exit after fuel vapor valves associated with fuel tanks where temperature and/or pressure are increasing are opened.

At 730, method 700 judges whether or not temperature and/or pressure are decreasing in one or more fuel tanks of the fuel system. The temperature and/or pressure within each of the fuel tanks in the fuel system may be inferred or measured via a sensor. If temperature and/or pressure in one or more fuel tanks in the fuel system is determined to be decreasing, the answer is yes and method 700 proceeds to 732. Otherwise, the answer is no and method 700 proceeds to 736.

At 732, method 700 opens a vapor valve that is positioned in a conduit between a fuel tank storing a higher octane fuel as compared to other fuel tanks in the fuel system and a fuel vapor storage canister that is storing fuel vapors from the fuel tank storing higher octane fuel. In systems where no vapor valve is positioned along a conduit between the fuel tank storing the higher octane fuel and the fuel vapor storage canister that is storing fuel vapors from the fuel tank storing higher octane fuel, no vapor valve along a conduit between the fuel tank storing higher octane fuel and the fuel vapor storage canister that is storing fuel vapors from the fuel tank storing higher octane fuel is opened at 732.

For example, vapor valve 506 is opened in the fuel system shown in FIG. 5 since vapor valve is positioned along a conduit that allows fluidic communication between fuel tank 230 and fuel vapor storage canister 202. Since no vapor valve is shown along conduit 488 of FIG. 4 which allows fluidic communication between fuel tank 230 and fuel vapor storage canister 402, no vapor valve along a conduit between the fuel tank storing higher octane fuel and the fuel vapor storage canister that is storing fuel vapors from the fuel tank storing higher octane fuel is opened at 732 for the system shown in FIG. 4.

However, vapor valves that allow fuel vapors into the fuel tank storing higher octane fuel from fuel vapor storage canisters storing fuel vapors from fuel tanks holding lower octane fuels are opened. For example, vapor valves 610 and 620 of FIG. 6 may be opened when temperature and/or pressure in one or more fuel tanks is decreasing. In particular, vapor valves 610 and 620 may be opened and vapor valves 612 and 622 may be closed when temperature and/or pressure is decreasing in fuel tank 230. By opening vapor valves that allow fluidic communication between fuel vapor storage canisters and the fuel tank storing higher octane fuel, it may be possible to transfer higher octane fuel components from fuel tanks storing lower octane fuels to a fuel tank storing higher octane fuel (e.g., from tanks 232 and 234 to tank 230). The fuel vapors may condense into liquid fuel within the fuel tank storing the higher octane fuel. In this way, component fuels may be separated with reduced parasitic losses.

At 734, method 700 closes vapor valves for fuel tanks in fuel systems that hold lower octane fuels. For example, in the fuel system of FIG. 5, vapor valves 508 and 510 are closed to reduce the possibility of transferring higher octane fuels to fuel tanks holding lower octane fuels. In the fuel system of FIG. 6, method 700 closes vapor valves 612 and 622 to reduce the possibility of transferring higher octane fuels to fuel tanks holding lower octane fuels. In other examples, check valves may replace vapor valves 408 and 410 in the system of FIG. 4. Similarly, check valves may replace vapor valves 612 and 622 in the system of FIG. 6, if desired. Method 700 proceeds to exit after the vapor valve positions are adjusted.

At 736, method 700 closes vapor valves after a predetermined amount of time has passed since temperature and/or pressure in the fuel tanks has increased or decreased. By closing the vapor valves, it may be possible to limit fluidic communication between fuel tanks and fuel vapor storage canisters when conditions in the fuel system are static.

In this way, method 700 allows operating states of fuel system valves to be adjusted while the engine is stopped so that fuel separation may occur without recombining higher octane fuels with lower octane fuel during diurnal heating and cooling that often occurs each day. Further, method 700 may use engine waste heat to increase the production of higher octane fuel vapors. Once higher octane fuel components are separated and stored in fuel vapor storage canisters, the higher octane fuel components remain separated from the lower octane fuels stored in the fuel tanks. The higher octane fuel vapors stored in fuel vapor storage canisters may be condensed in a fuel tank holding higher octane fuel before being injected to the engine.

As will be appreciated by one of ordinary skill in the art, method described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:
1. A fuel storage system for an engine, comprising:
a first fuel tank storing a first fuel;
a second fuel tank storing a second fuel having a lower octane than the first fuel;
a first fuel vapor storage canister;
a second fuel vapor storage canister;
a first conduit coupled to the first fuel tank and the first fuel vapor storage canister;
a second conduit not coupled to the first conduit, the second conduit coupled to the first fuel tank and the second fuel vapor storage canister;
a third conduit coupled to the second fuel vapor storage canister and an engine intake manifold;
a fourth conduit coupled to the engine intake manifold and the first fuel vapor storage canister;
a fifth conduit coupled to the second fuel tank and the second fuel vapor storage canister;
a valve positioned along the second conduit;
a valve positioned along the fifth conduit; and
a controller including executable instructions stored in non-transitory memory for:
during a first condition in which temperature and/or pressure in one or more of the fuel tanks is decreasing, closing the valve positioned along the fifth conduit and opening the valve positioned along the second conduit.

2. The fuel storage system of claim 1, further comprising a valve positioned along the third conduit.

3. The fuel storage system of claim 1, further comprising a valve positioned along the fourth conduit.

4. A fuel storage system for an engine, comprising:
a first fuel tank storing a first fuel;
a second fuel tank storing a second fuel having a lower octane than the first fuel;
a third fuel tank;
a first fuel vapor storage canister;
a second fuel vapor storage canister;
a third fuel vapor storage canister;
a first conduit coupled to the first fuel tank and the first fuel vapor storage canister;
a second conduit not coupled to the first conduit, the second conduit coupled to the first fuel tank and the second fuel vapor storage canister, and a valve located along the second conduit;
a third conduit coupled to the second fuel vapor storage canister and an engine intake manifold;
a fourth conduit coupled to the third fuel vapor storage canister and the first fuel tank;
a fifth conduit coupled to the second fuel tank and the second fuel vapor storage canister and a valve located along the fifth conduit;
a sixth conduit coupled to the third fuel tank and the third fuel vapor storage canister and a valve located along the sixth conduit; and
a controller including executable instructions stored in non-transitory memory for:
while the engine is not accepting fuel vapors and temperature and/or pressure in one or more of the fuel tanks is decreasing, closing the valves located along the fifth and sixth conduits and opening the valve located along the second conduit.

5. The fuel storage system of claim 4, further comprising a seventh conduit coupled to the engine intake manifold and the first fuel vapor storage canister.

6. The fuel storage system of claim 4, further comprising a valve positioned along the third conduit.

7. The fuel storage system of claim 5, further comprising an eighth conduit coupled to the third fuel vapor storage canister and the engine intake manifold.

8. The fuel storage system of claim 7, further comprising a valve located along the eighth conduit.

9. A method for processing fuel vapors in an engine, comprising:

storing a higher octane fuel in a first fuel tank and a lower octane fuel in a second fuel tank;

coupling the first fuel tank to a first fuel vapor storage canister including carbon via a first conduit;

coupling the first fuel tank to a second fuel vapor storage canister via a second conduit;

coupling the second fuel tank to the second fuel vapor storage canister via a third conduit; and in response to temperature and/or pressure in the first and/or second fuel tank decreasing, flowing fuel vapors from the second fuel vapor storage canister to the first fuel tank via the second conduit while preventing the flowing of fuel vapors from the second fuel vapor storage canister to the second fuel tank via the third conduit.

10. The method of claim 9, further comprising, in response to temperature and/or pressure in the first and/or second fuel tank increasing, flowing fuel vapors from the second fuel tank to the second fuel vapor storage canister.

11. The method of claim 9, further comprising coupling the first fuel tank to a third fuel vapor storage canister via a fourth conduit, coupling a third fuel tank to the third fuel vapor storage canister via a fifth conduit, and in response to temperature and/or pressure in the first, second, and/or third fuel tank decreasing, flowing fuel vapors from the third fuel vapor storage canister to the first fuel tank while preventing the flowing of fuel vapors from the third fuel vapor storage canister to the third fuel tank via the fifth conduit.

12. The method of claim 11, further comprising, in response to temperature and/or pressure in the first, second, and/or third fuel tank increasing, flowing fuel vapors from the third fuel tank to the third fuel vapor storage canister.

13. The method of claim 12, further comprising flowing fuel vapors from the third fuel vapor storage canister to an engine intake manifold.

14. The fuel storage system of claim 1, wherein during the first condition, the engine is off or the engine is on and deceleration fuel cut-out is occurring.

15. The fuel storage system of claim 14, further comprising executable instructions stored in non-transitory memory for, during a second condition in which the temperature and/or pressure in one or more of the fuel tanks is increasing, opening the valve positioned along the fifth conduit and closing the valve positioned along the second conduit.

16. The fuel storage system of claim 4, further comprising executable instructions stored in non-transitory memory for:
while the engine is not accepting fuel vapors and temperature and/or pressure in one or more of the fuel tanks is increasing, opening the valves located along the fifth and sixth conduits and closing the valve located along the second conduit.

* * * * *